(12) United States Patent
Lin

(10) Patent No.: US 9,543,765 B2
(45) Date of Patent: Jan. 10, 2017

(54) CENTRALIZED DC POWER SUPPLY CONTROL SYSTEM AND METHOD OF ECONOMICALLY CONTROLLING POWER CONSUMPTION

(71) Applicant: Lightstar Information Co., Ltd., New Taipei (TW)

(72) Inventor: Ming-Yi Lin, New Taipei (TW)

(73) Assignee: Lightstar Information Co., Ltd., New Taipei (TW)

( * ) Notice: Subject to any disclaimer, the term of this patent is extended or adjusted under 35 U.S.C. 154(b) by 537 days.

(21) Appl. No.: 14/047,378

(22) Filed: Oct. 7, 2013

(65) Prior Publication Data

US 2014/0097682 A1     Apr. 10, 2014

Related U.S. Application Data

(60) Provisional application No. 61/710,757, filed on Oct. 7, 2012.

(51) Int. Cl.
*H02J 3/00* (2006.01)
*H02J 4/00* (2006.01)
*H02J 1/10* (2006.01)

(52) U.S. Cl.
CPC .. *H02J 4/00* (2013.01); *H02J 1/10* (2013.01); *Y10T 307/352* (2015.04)

(58) Field of Classification Search
CPC ............ H02J 4/00; H02J 1/10; Y10T 307/352
USPC .......................................................... 307/26
See application file for complete search history.

(56) References Cited

U.S. PATENT DOCUMENTS

| 7,561,977 | B2* | 7/2009 | Horst ........................ | H02J 3/14 700/295 |
| 2010/0076615 | A1* | 3/2010 | Daniel ..................... | F03D 9/00 700/293 |
| 2015/0194842 | A1* | 7/2015 | Mondal .................... | H02J 1/10 307/23 |

* cited by examiner

*Primary Examiner* — Jared Fureman
*Assistant Examiner* — Duc M Pham
(74) *Attorney, Agent, or Firm* — Rosenberg, Klein & Lee

(57) ABSTRACT

An economical centralized DC power consumption control system is used to separate electric power into an AC circuit for high-power-consumption electric appliances such as TV set, refrigerator, washing machine, and air conditioner and a DC circuit for low-power-consumption electric appliances such as lamp, electric fan, notebook computer, tablet computer, mobile phone, and digital camera. The DC circuit is equipped with multiple high-powered power supplies, each of which transforms commercial power to DC power, provides electricity to various low-power-consumption electric appliances, and directly links the electric appliances for supply of electric energy without individual rectifiers/transformers.

13 Claims, 5 Drawing Sheets

CENTRALIZED DC POWER SUPPLY CONTROL SYSTEM AND METHOD OF ECONOMICALLY CONTROLLING POWER CONSUMPTION

BACKGROUND OF THE INVENTION

1. Field of the Invention

The present invention relates to a method for saving energy and, in particular, a centralized DC power supply providing DC power to electric appliances and a method for saving power by modulating total or individual power consumption.

2. Description of the Prior Art

Currently, a lighting facility, an electric appliance, or a 3C product needs a specific power supply (with a rectifier/transformer installed internally) which is able to transform 110/220V commercial power to an applicable voltage or DC power for the appliance. In this regard, a manufacturer may provide a power supply with the minimum power rating for a conventional electric appliance by considering manufacturing costs rather than considering power conversion efficiency of the electric appliance.

Therefore, 10~60% energy loss is created by a conventional electric appliance's power supply and radiated as heat in the course of transforming AC power to DC power. For example, a 60 W power supply with power conversion efficiency of 60% implies 24 W electric power converted to heat, which is dissipated in ambient air and results in not only senseless repetitive energy loss or waste but also creates burden for an air conditioner system, which consumes additional electric power to take heat away.

In a power supply control system of a conventional lighting facility, each lighting unit needs a specific power supply, each of which causes the above-noted energy loss and is additionally provided with a dimmer unit for dimming the single lighting unit. For simultaneous dimming of more than one lighting unit, a dimmer control circuit should be designed in the dimmer unit of each lighting unit. However, a conventional dimming approach consuming electricity to reduce illumination of a lighting unit still fails to reduce total power consumption and generate energy savings.

As shown in FIG. 4A, three 40 W, 50 W and 60 W lamps 8 as lighting facilities linking an AC power unit 81 consume full power, that is, 40+50+60=150 W.

As shown in FIG. 4B, LED lamps 7 as alternative lighting facilities comprise rectifiers/transformers 71, which are held in the LED lamps 7 or installed additionally and have the same functions of conventional lamps 8 (FIG. 4A), consuming full power of 150 W while turned on simultaneously.

In summary, conventional lighting facilities have the following drawbacks:

1. A specific power supply working with each lighting unit has a lower power rating, a low Power Factor (PF) and poor power conversion efficiency which contribute to power consumption costs;

2. Specific power supplies working with all lighting units result in repetitive energy losses during power conversion, which contribute to power consumption costs;

3. Identical dimmer units installed in all lighting units for dimming increase acquisition costs; and 4. An approach based on resistances to consume electric power and reduce illumination of a lighting unit increases electricity expenses because the total power consumption remains the same.

Accordingly, the inventor, considering various drawbacks derived from conventional methods, created and developed a centralized DC power supply system and a method for economically controlling power consumption, after years of research.

SUMMARY OF THE INVENTION

An object of the present invention is to provide a method of economically controlling power consumption via a centralized DC power supply system which separates supplied commercial power into (a) an AC circuit for high-power-consumption electric appliances such as TV set, refrigerator, washing machine, and air conditioner and (b) a DC circuit for low-power-consumption electric appliances such as lamp, electric fan, notebook computer, tablet computer, mobile phone, and digital camera, featuring DC power exported by power supplies with Power Factor (PF) greater than 0.99 for energy loss of less than 1% during AC-to-DC transfer and saving of 10~20% electricity consumption without excessively repetitive applications of power supplies.

Another object of the present invention is to provide an economical centralized DC power consumption control system which depends on centralized DC power supplies (with rectifiers/transformers installed) to supply electric appliances with electricity and realize energy saving via modulation of total power consumption.

Another object of the present invention is to provide an economical centralized DC power consumption control system used in LED lamps and a method of economically controlling power consumption via a centralized DC power system, so as to reduce total power consumption and generate energy savings by simultaneously dimming one or more LED lamps.

The economical centralized DC power consumption control system for the above purposes separates electric power into an AC circuit and a DC circuit. The AC circuit provides electric power to high-power-consumption electric appliances such as TV set, refrigerator, washing machine, and air conditioner. The DC circuit provides electric power to low-power-consumption electric appliances such as lamp, electric fan, notebook computer, tablet computer, mobile phone, and digital camera. The DC circuit is equipped with one or more high-powered power supplies which transform commercial power to DC power and directly provide electricity to all low-power-consumption electric appliances without individual rectifiers/transformers.

The present invention has at least the following advantages:

(1) High power conversion efficiency. A power supply with a power rating over 100 W has high power conversion efficiency and features neither excessive energy loss nor heat generation, both of which indirectly moderate applications of air conditioners.

(2) Supplies of stable voltages. More options for AC power supplies are available, e.g., full voltages from 90V to 264V basically or from 90V to 305V in some cases. This has a lesser impact on electric appliances in some areas where electricity is erratic or fluctuates because of unstable AC power. Supply of stable DC power output moderates failure rates of electric appliances.

(3) Electric appliances have a longer service life. An electric appliance with no rectifier/transformer installed generates heat less and indirectly extends service life of the electric appliance.

(4) Improved security. 24V DC power with current less than 1.7 amp does not shock a user, who avoids trouble when measuring current or power without contact oxidation attributed to arcing.

(5) Direct parallel connection with green energy devices such as wind power equipment and solar energy equipment. There is no energy loss during DC-to-AC and AC-to-DC transfer via repetitive rectification/transformation but parallel connection with power supplies.

DETAILED DESCRIPTION OF THE PREFERRED EMBODIMENTS

Figure 1:
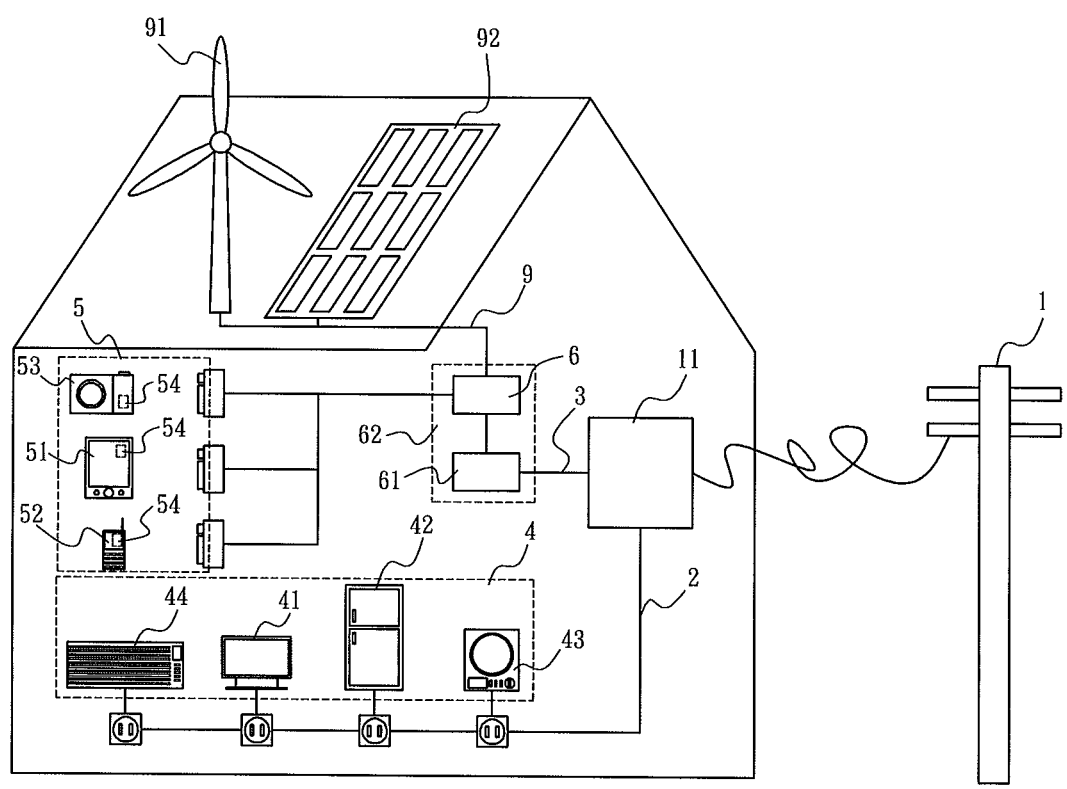
FIG. 1 illustrates an economical centralized DC power consumption control system of the present invention.

Reference is made to FIG. 1 which illustrates the economical centralized DC power consumption control system of the present invention, which separates electric power from a commercial power system 1 into an AC circuit 2 and a DC circuit 3 via a user's distribution panel 11. The AC circuit 2 provides electric power to high-power-consumption electric appliances 4 such as TV set 41, refrigerator 42, washing machine 43, and air conditioner 44. The DC circuit 3 provides electric power to low-power-consumption electric appliances 5 such as LED lamp, electric fan, notebook computer, tablet computer 51, mobile phone 52, and digital camera 53 via a high-powered power supply 6. The power supply 6 exports common voltages as electric energy directly delivered to the electric appliances 5 without requiring rectifiers/transformers. The power supply 6 comprises a rectifier/transformer unit 61 and a power output control unit 62. The rectifier/transformer unit 61 transfers AC power from the commercial power system 1 to DC power which is delivered to the electric appliances 55 through the power output control unit 62 for limited total output power.

The AC-to-DC power supply 6 is capable of transforming electric power out of the commercial power system 1 to DC power for the electric appliances 5 through the rectifier/transformer unit 61. The AC-to-DC power supply 6 has a predefined rated power (WMAX) and an actual output power (W) referring to the rated power (WMAX) and modulated by the power output control unit 62, which regulates the actual output power (W) of the power supply 6 by changing a voltage or current value.

As per one or more electric appliances 5 deployed, the electric appliances 5 develop total power consumption (WLOAD) which is less than, equal to, or greater than the rated power (WMAX) of the power supply 6. If the total power consumption (WLOAD) of the electric appliances 5 greater than the rated power (WMAX), the power output control unit 62 should supply the rated power, i.e., the maximum total power consumption, for no outage attributed to overload greater than the rated power.

In addition, the electric appliance 5 is internally or externally equipped with a power limiter 54 which prevents the electric appliance 5 from failure due to high electric power exported by the power supply 6, transmitting a modulated resistance (voltage) value or sending the power output control unit 62 any electric signal of a limited power value (WLIMIT) by which the power output control unit 62 changes a voltage or current value and further an actual output power (W).

The electric appliance 5 depends on energy efficiency or changed power (e.g., dimming of LED lamps) to modulate the power limiter 54, thereby changing the supply of total electric power. The power limiter 54 relies on disposition of the electric appliance 5 to give the power output control unit 62 the limited power value (WLIMIT).

The power output control unit 62 is based on a control signal for the limited power value (WLIMIT) of the power limiter 54 and current modulation, voltage modulation or PWM modulation to change a voltage or current value of the power supply 6 and make the actual output power (W) identical to the limited power value (WLIMIT). The electric appliances 5 are able to change electricity consumption or power consumption due to modulation of the actual output power (W).

Figure 2:
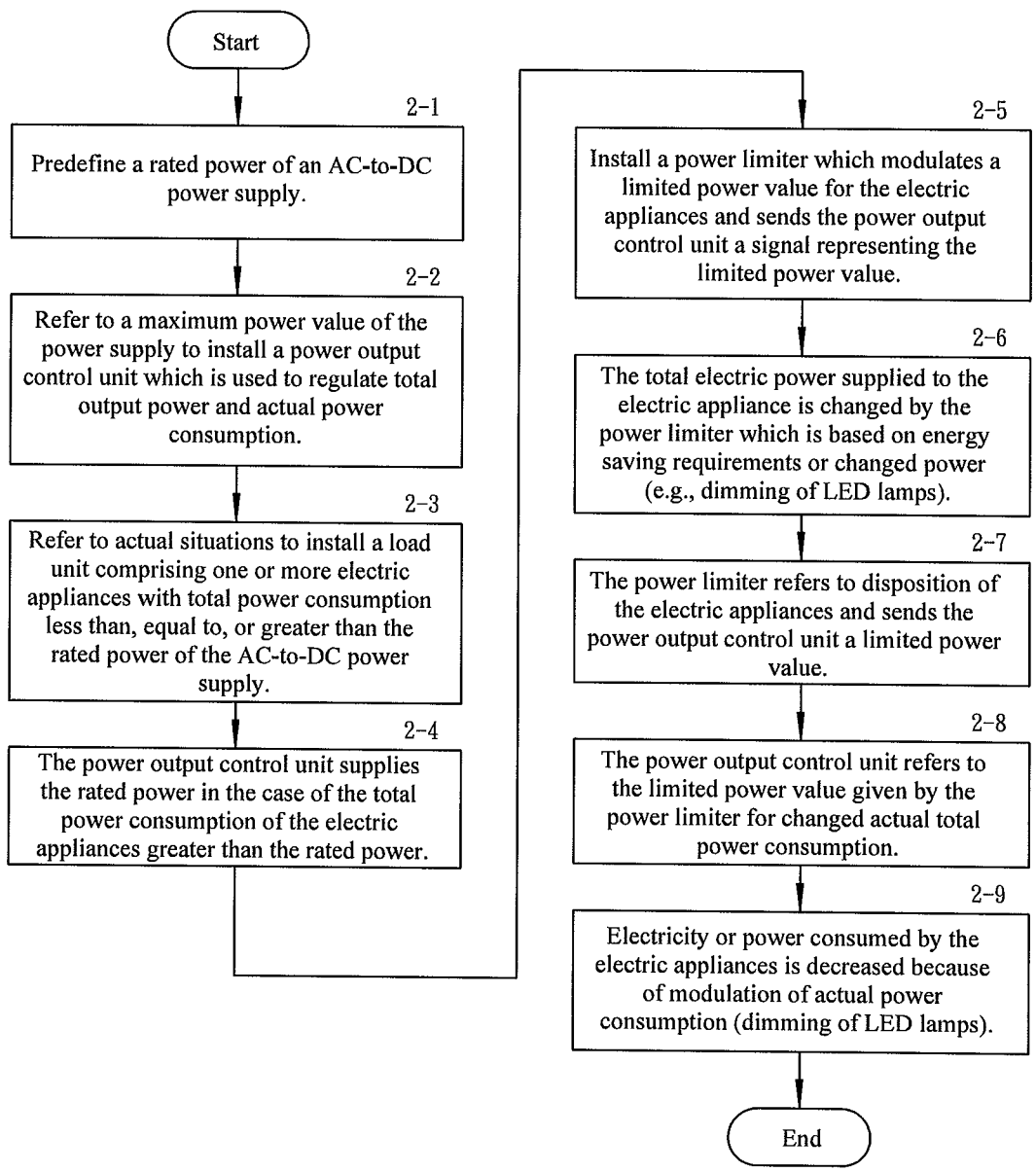
FIG. 2 is a flow chart of the economical centralized DC power consumption control system.

As shown in FIG. 2, the economical centralized DC power consumption control system is based on a practical method as follows:

2-1: A rated power of an AC-to-DC power supply 6 is predefined;

2-2: A maximum power value of the power supply 6 is referred to, to install a power output control unit 62, which is used to regulate total output power and actual power consumption;

2-3: Actual situations are referred to, to install a load unit comprising one or more electric appliances 5 with total power consumption less than, equal to, or greater than the rated power of the AC-to-DC power supply 6;

2-4: The power output control unit 62 supplies the rated power if the total power consumption of the electric appliances 5 is greater than the rated power;

2-5: A power limiter 54 is installed, which modulates a limited power value for the electric appliances 5 and sends the power output control unit 62 a signal representing the limited power value;

2-6: The total electric power supplied to the electric appliance 5 is changed by the power limiter 54, which is based on energy saving requirements or changed power (e.g., dimming of LED lamps);

2-7: The power limiter 54 refers to disposition of the electric appliances 5 and sends the power output control unit 62 a limited power value;

2-8: The power output control unit 62 refers to the limited power value given by the power limiter 54 for changed actual total power consumption; and 2-9: Electricity or power consumed by the electric appliances 5 is decreased because of modulation of actual power consumption (dimming of LED lamps).

Figure 3A:
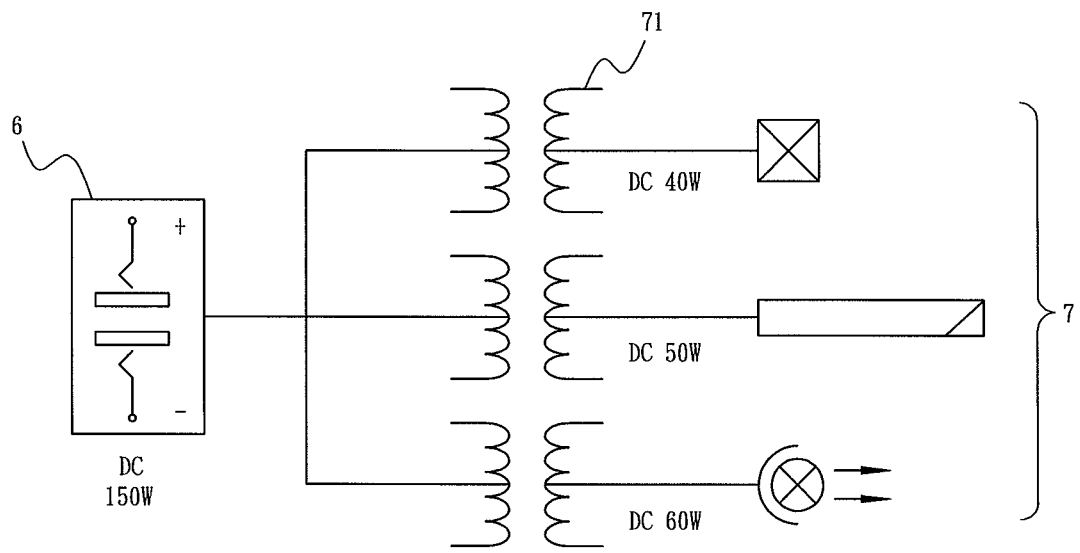
FIGS. 3A through 3D are schematic views illustrating the economical centralized DC power consumption control system used in LED lamps.
Figure 3B:
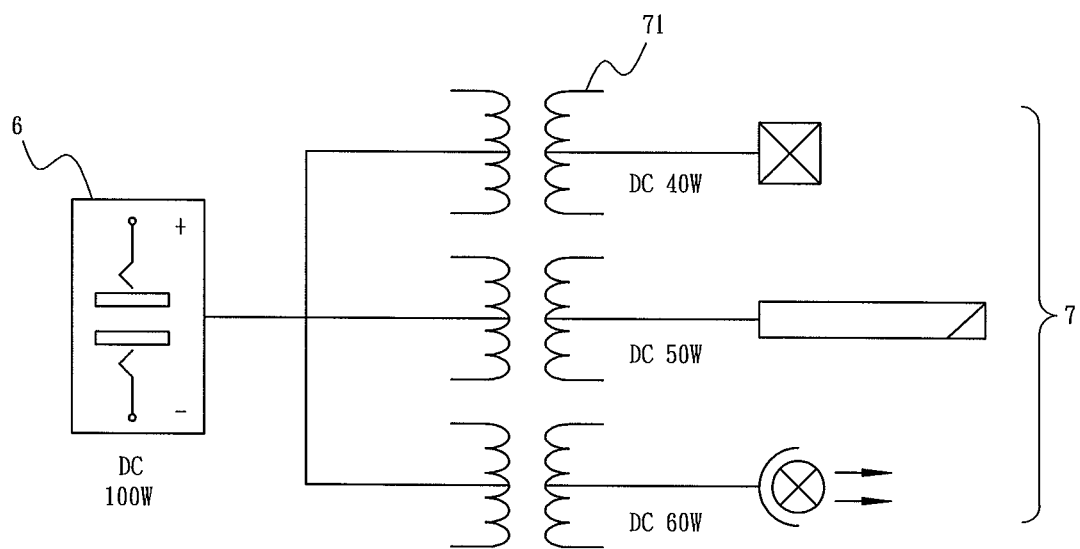
Figure 3C:
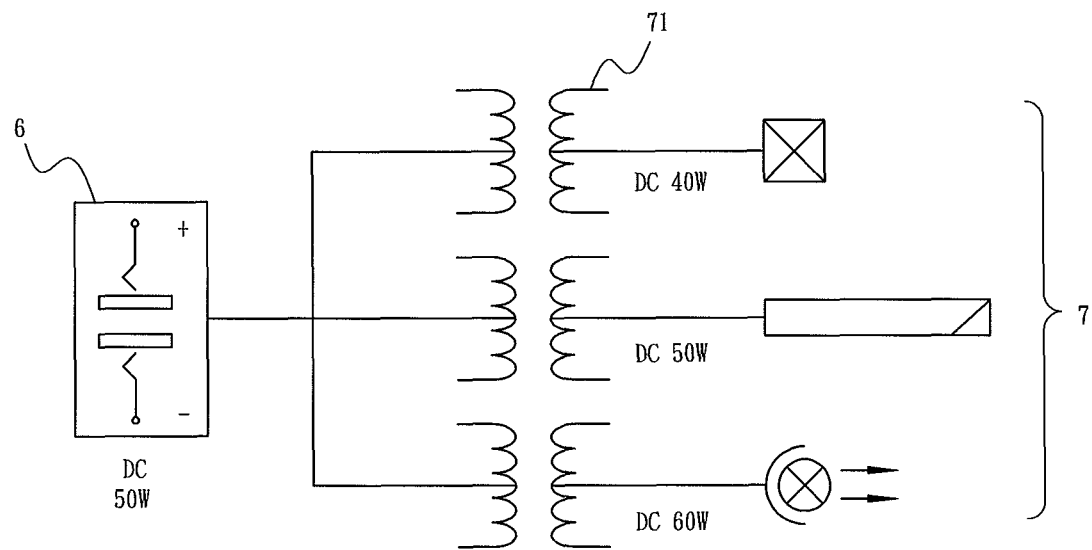
Figure 3D:
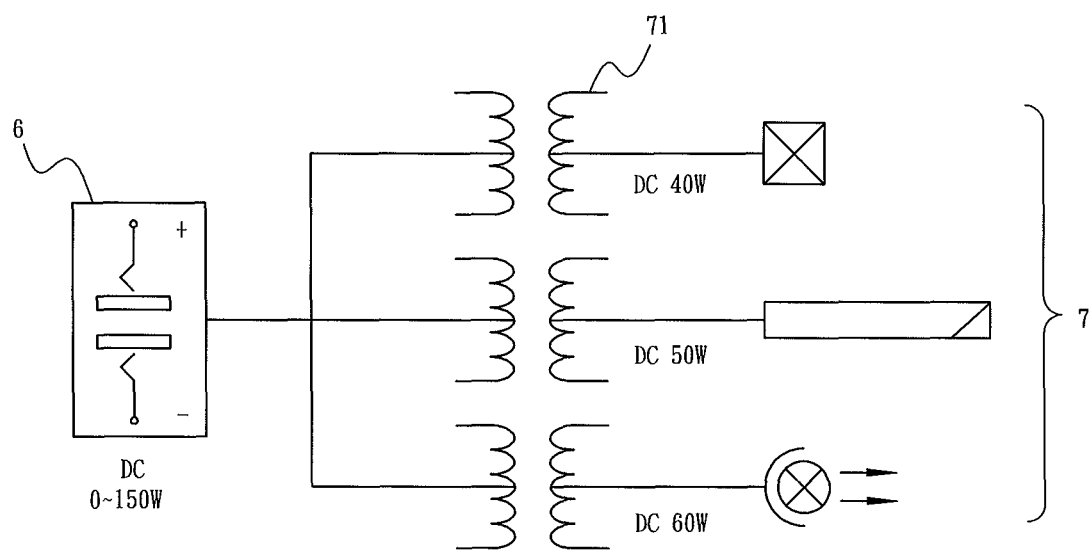
Figure 4A:
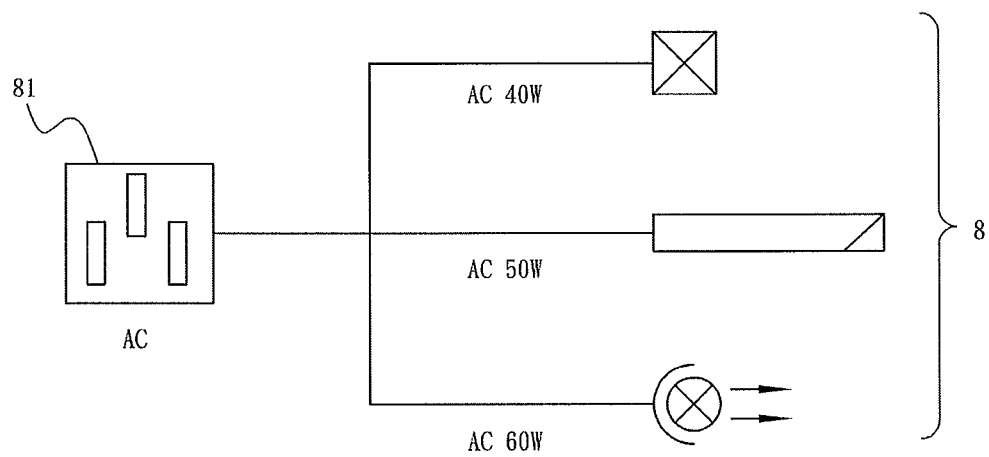
FIGS. 4A through 4B are schematic views illustrating a conventional power system used in lamps.
Figure 4B:
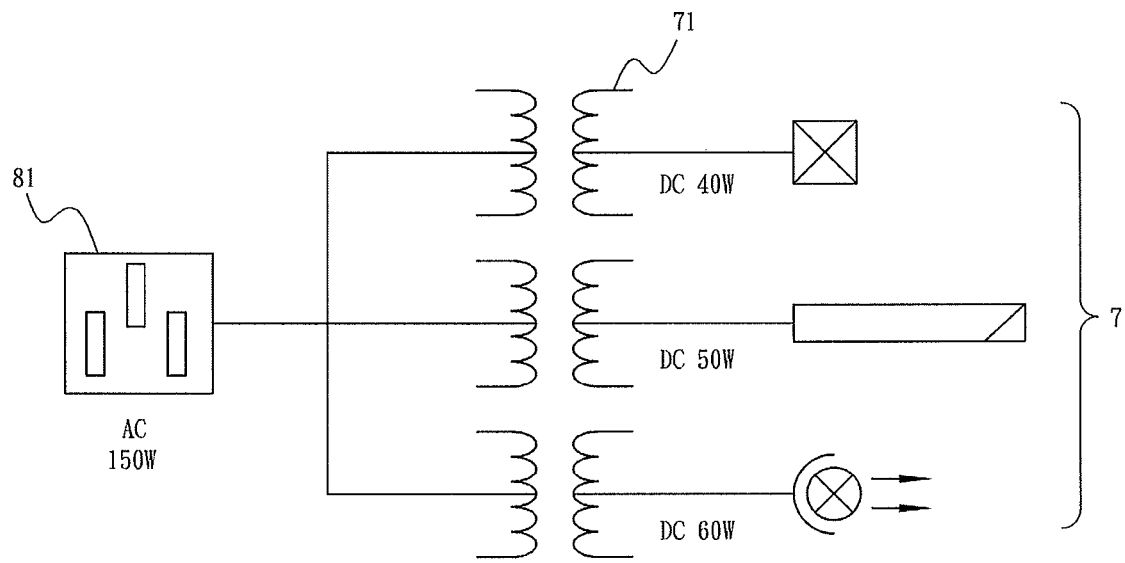

The present invention is used in low-power-consumption DC electric appliances 5 comprising LED lamps 7 to which DC power are supplied, as shown in FIG. 4B. Thus, each of the LED lamps 7 needs a power supply 6 which transforms AC power from the commercial power system 1 to DC power for supply of electricity to the LED lamps 7. For example, an LED lamp 7 with actual power consumption of 8 W links a manufacturer's power supply 6 providing a rated power over 8 W and ensuring sufficient electric power and less energy loss attributed to power conversion. In virtue of forty 8 W LED lamps 7 consuming 320 W, the manufacturer may supply forty units of 10 W power supplies 6. As shown in FIGS. 3A through 3D, a high-efficiency 320 W power supply 6 for modulated power consumption is substituted for the forty units of conventional 10 W power supplies 6 and contributes not only to a reduction in energy loss attributed to power conversion, but also to control and modulation of total power consumption to save energy.

In the case of 80% actual illumination satisfying a user's need for lighting, the power supply 6 can be adjusted to supply electric power of 256 W and activate the LED lamps 7 which provide lowered illumination, thereby consuming 80% of electricity and saving 20% of electricity when the electric power supplied is less than a designed rated power. Moreover, the LED lamps 7 will generate heat less and have longer service lives because 20% less electric power is required for activation.

Specifically, DC power transformed from conventional electric power of 150 W via the power supply 6 (FIG. 3A) is supplied to three 40 W, 50 W and 60 W LED lamps 7 which consume electric power of 150 W while turned on simultaneously.

Reference is made to FIG. 3B which illustrates three LED lamps 7 consuming a total electric power of 100 W, which run normally and with slightly decreased illumination. This realizes energy savings and the need for dimming when electric power of the power supply 6 is lowered to 100 W.

Reference is made to FIG. 3C which illustrates three LED lamps 7 consuming a total electric power of 50 W, which run normally and with slightly decreased illumination. This realizes energy savings and the need for dimming when electric power of the power supply 6 is lowered to 50 W.

Reference is made to FIG. which that illustrates LED lamps 7, which link the power supply 6 with output power modulated according to the need for illumination, run normally, and satisfy a variety of dimming conditions.

Furthermore, conventional DC power comprises various voltages such as 5V, 12V, 24V, 36V and 48V. For example, solar energy which is 24V in a current power system supplies AC power to the electric appliances 5 via a DC-to-AC transformer, yet the electric appliances 5 consume DC power transformed during AC-to-DC transfer in which more energy sources are wasted. However, the present invention supplies DC power directly without excessive energy loss. In addition, it is inappropriate to use the present invention in a long-distance application because of a voltage drop attributed to a reduced wire diameter according to the equation for a voltage drop, $V=I \times R$ (I: current; R: wire length/wire diameter). In other words, an output voltage through an electric wire (diameter=1 mm) which has a voltage drop less than 10% within 33 m needs to be slightly increased when the wire's length is longer than 33 m. An output voltage through an electric wire (diameter=2 mm) which has a voltage drop less than 10% within 120 m needs to be slightly increased when the wire's length is longer than 120 m. In other words, an output voltage is modulated by a distance between the power supply 6 and the electric appliance 5 for less energy loss during power conversion and satisfactory applications in various conditions.

For reliability and availability of the power supply 6, the multiple power supplies 6 can be connected in parallel, i.e., the parallel power supplies 6 still work even if one fails. Green energy installations 9 such as wind power equipment 91 and solar power equipment 92 generating DC power can be connected to the power output control unit 62 of the power supply 6 for less dependence on commercial power or supply of DC power during a commercial power outage. The power output control unit 62 links batteries which are used to store electricity generated by the green energy installations 9 for contingent use in case of an oversupply of electric power.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method of economical centralized DC power consumption control, comprising steps as follows:
    separating supplied electric power into an AC circuit for high-power-consumption electric appliances including TV set, refrigerator, washing machine and air conditioner and a DC circuit for low-power-consumption electric appliances including lamp, electric fan, notebook computer, tablet computer, mobile phone and digital camera;
    transforming commercial power to DC power via a high-powered power supply in said DC circuit, and providing electricity to all low-power-consumption electric appliances;
    restricting total power consumption of electric appliances activated simultaneously for energy saving as per modulated power of said power supply,
    wherein said DC circuit is used to modulate output voltage or current which matches running of an electric appliance for energy saving as per a distance between said power supply and said electric appliance.

2. The method of economical centralized DC power consumption control according to claim 1, wherein said DC circuit links multiple power supplies which are connected in parallel and still work even if one of the multiple power supplies fails.

3. The method of economical centralized DC power consumption control according to claim 1, wherein said DC circuit contributes to less energy loss attributed to AC-to-DC transfer by modulating a distance between said power supply and said electric appliance.

4. The method of economical centralized DC power consumption control according to claim 1, wherein said power supply provides output voltages between 10V and 60V.

5. The method of economical centralized DC power consumption control according to claim 1, wherein said power supply is connected to green energy installations such as wind power equipment and solar energy equipment for less dependence on commercial power or supply of DC power during outage of commercial power.

6. An economical centralized DC power consumption control system separating supplied electric power into an AC circuit and a DC circuit,
    wherein said DC circuit is equipped with a high-powered power supply for all low-power-consumption electric appliances including lamp, electric fan, notebook computer, mobile phone and digital camera and provides common voltages to said electric appliances directly without requiring rectifiers/transformers,
    wherein said power supply contributes to less energy loss attributed to AC-to-DC transfer by modulating a distance between said power supply and said electric appliance.

7. The economical centralized DC power consumption control system according to claim 6, wherein said DC circuit links multiple power supplies which are connected in parallel and still work even if one of the multiple power supplies fails.

8. The economical centralized DC power consumption control system according to claim 6, wherein said power supply comprises a rectifier/transformer unit and a power output control unit, and said rectifier/transformer unit transforms commercial power to DC power which is delivered to said electric appliances for limited total output power via said power output control unit.

9. The economical centralized DC power consumption control system according to claim 8, wherein said power output control unit of said power supply is connected to green energy installations such as wind power equipment and solar energy equipment for less dependence on commercial power or supply of DC power during outage of commercial power.

10. The economical centralized DC power consumption control system according to claim 9, wherein said power output control unit links batteries which are used to store electricity generated by said green energy installations for contingent use in case of oversupply of electric power.

11. The economical centralized DC power consumption control system according to claim 6, wherein said electric appliance is equipped with a power limiter which prevents said electric appliance from failure due to high electric power exported by said power supply.

12. The economical centralized DC power consumption control system according to claim 6, wherein said power supply is one power supply with its output power modulated.

13. The economical centralized DC power consumption control system according to claim 6, wherein said electric appliance comprises a plurality of LED lamps which directly link said power supply for electric energy without requiring rectifiers/transformers, referring to magnitude of electric power of said power supply for change of LED lamps' count or illumination, energy saving, and dimming.

\* \* \* \* \*